March 16, 1926.
R. S. PARKER
SIGNAL
Filed August 22, 1925
1,576,536
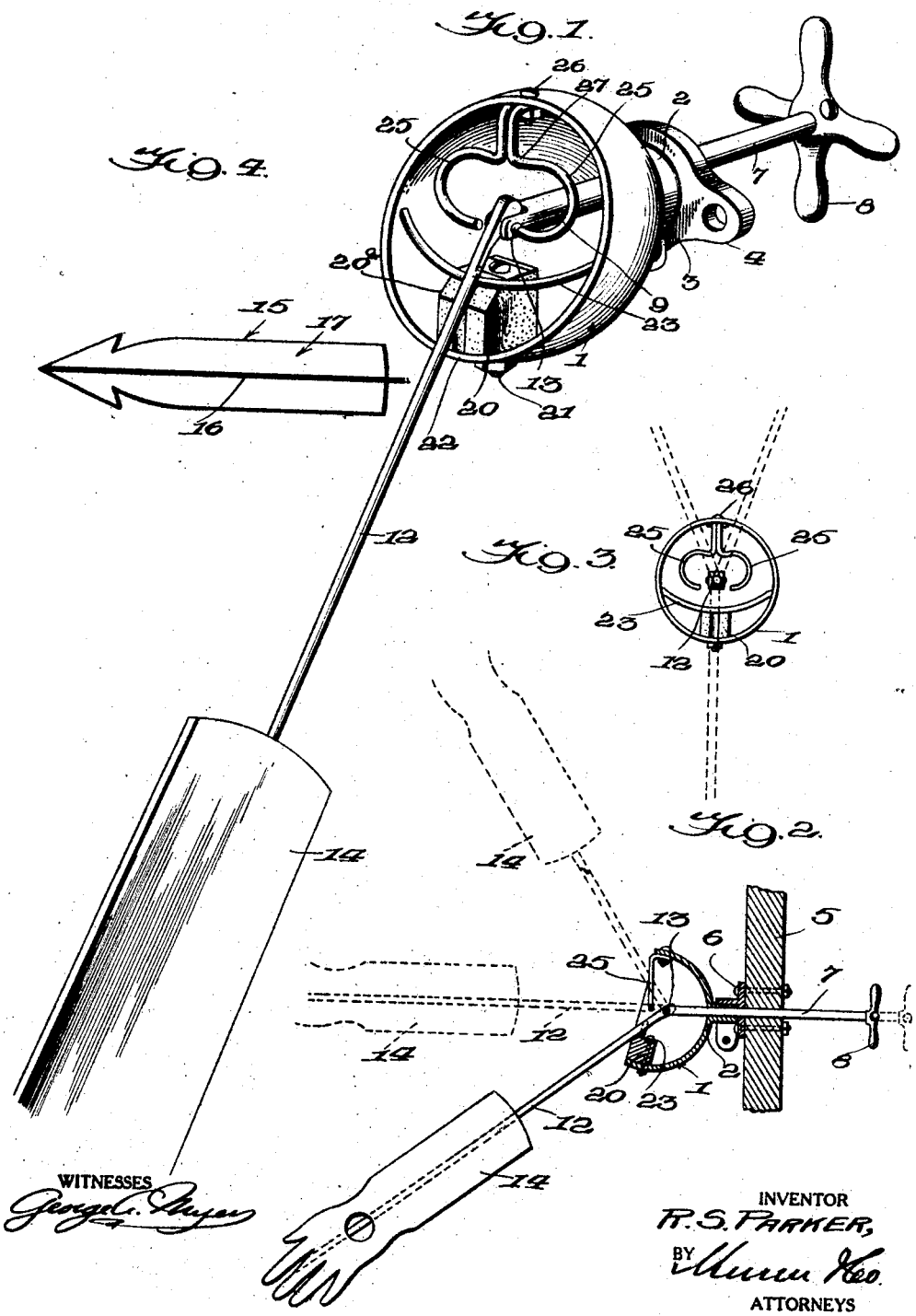
INVENTOR
R. S. PARKER,
BY
ATTORNEYS Patented Mar. 16, 1926.

1,576,536

UNITED STATES PATENT OFFICE.

ROBERT S. PARKER, OF OTTAWA, KANSAS.

SIGNAL.

Application filed August 22, 1925. Serial No. 51,857.

*To all whom it may concern:*

Be it known that I, ROBERT S. PARKER, a citizen of the United States, residing at Ottawa, in the county of Franklin, State of Kansas, have invented certain new and useful Improvements in Signals, of which the following is a specification.

This invention relates to an improvement in signals especially adapted for use on automobiles and other motor vehicles and aims to provide a signal of this character which is disposed without the body of the vehicle but which may be conveniently operated by the driver of the vehicle without disturbing his control of the vehicle itself and which may be set to give a clear and unmistakable indication of contemplated changes in the rate or direction of motion of the vehicle. In other words, if the operator intends to make a right hand or a left hand turn or to stop, a signal may be quickly set to plainly show the intention and remain set until the change in the rate of direction of motion has been consummated and the signal readjusted. The signal in its normal position is visible to operators of surrounding vehicles and thereby gives indication that the operator of the vehicle on which the signal is mounted intends no change in the rate or direction of motion of his vehicle.

A further object of the invention is to provide a device of this character and having these advantages and capacities and which is of simple and durable construction, reliable in operation, attractive in appearance and easily and comparatively inexpensive to manufacture and apply.

Other objects and advantages reside in certain novel features of the construction, arrangement and combination of parts which will be hereinafter more fully described and particularly pointed out in the appended claims, reference being had to the accompanying drawings forming a part of this specification, and in which:—

Figure 1 is a perspective view showing one embodiment of the invention,

Figure 2 is a view thereof partly in vertical section and partly in side elevation, Figure 3 is a view in end elevation, and Figure 4 illustrates a modified form of signaling element.

Referring to the drawings the numeral 1 designates a casing which takes the form of a section of hollow surfaces and which has integral therewith a bearing 2. The bearing 2 is formed with a flange 3 having integral apertured ears 4 whereby the bearing and casing may be conveniently supported on the portion 5 of an automobile or the like by means of bolts and nuts 6.

An operating shaft 7 is rotatably and slidably fitted in the bearing 2. The inner end of the shaft has an operating element or hand wheel 8 fixed thereto in order that the shaft 7 may be rotated or slid with facility by the operator of the vehicle. The outer end of the shaft 7 is provided with a shoulder 9 engageable with a shoulder 10 adjacent the outer end of the bearing 2 to limit the inward sliding movement of the shaft 7. The outer end of the shaft 7 is bifurcated and the arms of the bifurcation embrace the inner perforate end of a signaling arm 12. A pivot bolt 13 connects the arms of the bifurcated outer end of the shaft 7 to the perforated inner end of the arm 12 in such a manner that the arm 12 may swing in one plane; that is, in a vertical plane relative to the shaft 7 and yet is constrained to partake of the rotary movement of the shaft 7.

To the outer end of the signaling arm 12 an illuminated signaling hand 14 is applied. In lieu of the signaling hand an arrow-shaped signaling element 15 may be employed and may consist of blades 16 and 17 disposed at right angles to each other and carrying different signaling indicia and being illuminated by different colored lights.

The forward edge of the casing 1 is inclined so that the lower portion of the same projects outwardly beyond the upper portion thereof. Centrally of the lower portion a grooved elastic block 20 is secured by means of a bolt and nut 21. The casing is notched, as at 22, to insure contact between the signaling arm and the grooved block when the device is operated. Just above the block 20 a transversely extending and downwardly curved camming rod 23 is provided. The ends of the rod 23 are fastened to the casing at diametrically opposite points and the intermediate portion thereof is curved, as clearly shown in the drawings, the curvature being such that the rod is lowest at its middle and rises upwardly toward each end. Above the rod a pair of oppositely disposed U-shaped camming members 25 are provided and are formed of a single piece of wire or rod stock, the intermediate portion of which is doubled to provide an attaching element which is secured by a bolt and nut 26 to the top portion of the casing 1. In use the signaling arm hangs down vertically from the casing when the vehicle is going straight ahead. If a right hand turn is contemplated the operator of the vehicle grasps the hand wheel 8 and pulls the shaft 7 inwardly which causes the arm 12 to ride upon the inclined portion 20ª of the grooved face of the block 20, thereby disposing the signal in its lower portion at an angle of 45°, thereby indicating that a right hand turn is about to be made. The parts remain in this position since the weight of the signaling arm is resolved into an upward thrust on the shaft due to its fulcrum on the inclined face of the block or on the rod 23, depending upon how far inwardly it is pulled. If it is desired to give a signal to indicate that a left hand turn is being made the hand wheel 8 is pulled inwardly as in signaling a right hand turn and thereafter it is rotated to cause the arm 12 to ride across the camming rod 23 and up the inclined forward edge of the casing 1 onto the top of one of the U-shaped camming pieces 25 and into the notch or seat 27 provided therefor in the camming face 25 with which it is engaged. When so disposed the signaling element extends upwardly and outwardly at an angle of 45°. This operation will be better understood when it is borne in mind that the signaling element or arm is rotated while held at an angle of 45° to the longitudinal axis of the shaft 7 on which it is carried. When a stop is contemplated the operator simply pulls the shaft 7 in as far as it can go which brings the inner end of the signaling arm into the outer enlarged portion of the bearing 2 to cause the signaling arm to be held in a horizontal position and extending outwardly from the vehicle.

I claim:—

1. In a signal, a casing having a bearing, an operating shaft rotatably and slidably fitted in the bearing, a signaling arm, means for hinging the arm to the shaft to permit it to swing in one plane relative to the shaft while constraining it to rotate with the shaft, means on the casing co-operable with the arm for swinging the arm to an outwardly and downwardly inclined position when the shaft is pulled inwardly a short distance, means on the casing co-operable with the arm and causing the arm to swing upwardly and outwardly when the shaft is rotated after having been pulled inwardly a short distance, and means on the casing co-operable with the arm for holding the same in an extended and substantially horizontal position when the shaft is pulled inwardly as far as it may be.

2. In a signal, a casing having a bearing, an operating shaft rotatably and slidably fitted in the bearing, a signaling arm, means for hinging the arm to the shaft to permit it to swing in one plane relative to the shaft while constraining it to rotate with the shaft, means on the casing co-operable with the arm for swinging the arm to an outwardly and downwardly inclined position when the shaft is pulled inwardly a short distance, and means on the casing co-operable with the arm and causing the arm to swing upwardly and outwardly when the shaft is rotated after having been pulled inwardly a short distance.

3. In a signal, a casing having a bearing, an operating shaft rotatably and slidably fitted in the bearing, a signaling arm, means for hinging the arm to the shaft to permit it to swing in one plane relative to the shaft while constraining it to rotate with the shaft, means on the casing co-operable with the arm for swinging the arm to an outwardly and downwardly inclined position when the shaft is pulled inwardly a short distance and comprising a block having a grooved face co-operable with the arm, and means on the casing co-operable with the arm and causing the arm to swing upwardly and outwardly when the shaft is rotated after having been pulled inwardly a short distance.

4. In a signal, a casing having a bearing, an operating shaft rotatably and slidably fitted in the bearing, a signaling arm, means for hinging the arm to the shaft to permit it to swing in one plane relative to the shaft while constraining it to rotate with the shaft, means on the casing co-operable with the arm for swinging the arm to an outwardly and downwardly inclined position when the shaft is pulled inwardly a short distance, means on the casing co-operable with the arm and causing the arm to swing upwardly and outwardly when the shaft is rotated after having been pulled inwardly a short distance and comprising a transversely extending camming rod having its ends fixed to the casing and having its intermediate portion downwardly curved, and a semi-circular camming member carried by the casing in spaced relation to the edge thereof, the forward edge of the casing being inclined and having its lower portion projecting outwardly beyond its upper portion.

5. In a signal, a casing having a bearing, an operating shaft rotatably and slidably fitted in the bearing, a signaling arm, means for hinging the arm to the shaft to permit it to swing in one plane relative to the shaft while constraining it to rotate with the shaft, means on the casing co-operable with the arm for swinging the arm to an outwardly and downwardly inclined position when the shaft is pulled inwardly a short distance, means on the casing co-operable with the arm and causing the arm to swing upwardly and outwardly when the shaft is rotated after having been pulled inwardly a short distance and including a transverse camming member and a pair of oppositely disposed U-shaped camming members carried by the casing above the transverse camming member, the forward edge of the casing being designed to co-act with the camming members in causing the signaling arm to swing outwardly and upwardly as the shaft is rotated.

6. In a signal, a casing having a bearing, an operating shaft rotatably and slidably fitted in the bearing, a signaling arm, means for hinging the arm to the shaft to permit it to swing in one plane relative to the shaft while constraining it to rotate with the shaft, and means on the casing co-operable with the arm and causing it to swing upwardly and outwardly when the shaft is rotated after having been pulled inwardly a short distance.

7. In a signal, a casing having a bearing, an operating shaft slidably fitted in the bearing, a signal arm hingedly connected to the shaft, said signaling arm hanging down vertically in signaling position, and a part on said casing engageable with the signal arm to cause the same to swing upwardly when the shaft is drawn inwardly a short distance, said casing having a socket receiving the inner end of the arm when the shaft is drawn upwardly as far as it may be for holding the arm in substantially horizontal position.

8. In a signal, a casing having a bearing, an operating shaft rotatably and slidably fitted in the bearing, a signaling arm, means for hinging the arm to the shaft to permit it to swing in one plane relative to the shaft while constraining it to rotate with the shaft, and means on the casing co-operable with the arm and causing it to swing upwardly and outwardly when the shaft is rotated after having been pulled inwardly a short distance and comprising a pair of oppositely disposed camming members in which the arms are selectively co-operable when the shaft is rotated after having been pulled inwardly a short distance.

9. In a signal, a casing having a bearing, an operating shaft rotatably and slidably fitted in the bearing, a signaling arm, means for hinging the arm to the shaft to permit it to swing in one plane relative to the shaft while constraining it to rotate with the shaft, an elastic block having a groove receiving the arm and having a flat face whereby the arm is held against noise or vibration when in non-signaling position and is swung to an outwardly and downwardly inclined position when the shaft is pulled inwardly a short distance, and means on the casing co-operable with the arm and causing the arm to swing upwardly and outwardly when the shaft is rotated after having been pulled inwardly a short distance.

ROBERT S. PARKER.